United States Patent Office 2,907,662
Patented Oct. 6, 1959

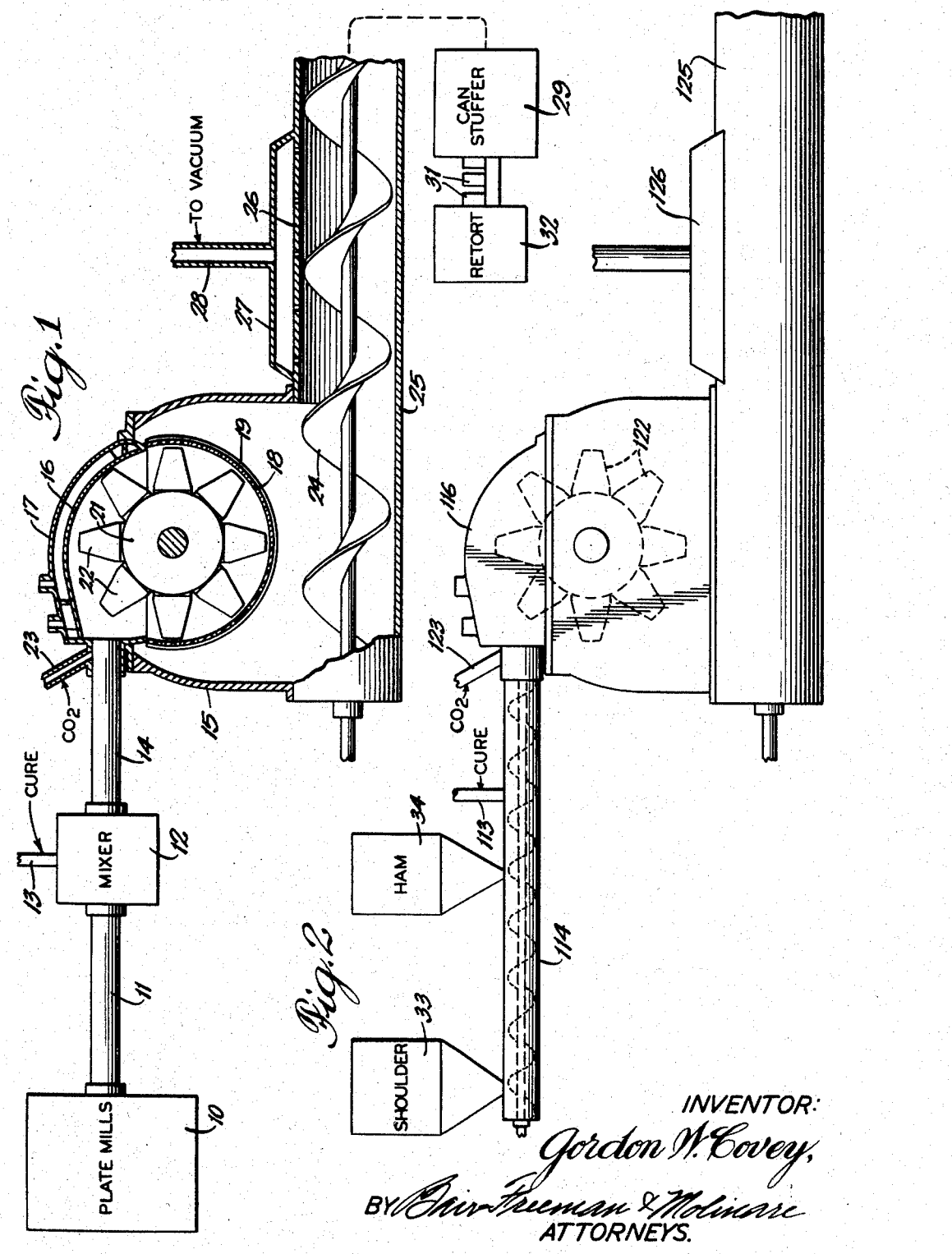

2,907,662

METHOD OF PREPARING MEAT PRODUCTS

Gordon W. Covey, Downers Grove, Ill., assignor to The W. J. Fitzpatrick Company, Chicago, Ill., a corporation of Illinois Application February 25, 1957, Serial No. 642,091

4 Claims. (Cl. 99—187)

This invention relates to a method of preparing meat products and more particularly to the preparation of canned meat loaves, and the like. It has been standard practice for many years in the meat industry in preparing canned cured pork loaves and similar meat products to hold the raw chunks of meat, such as pork shoulder and ham trimmings in a cold room in carts until the product has been reduced to a temperature of about 28° F. Thereafter, the meat is run through a plate mill having about a three-fourths inch orifice, is mixed with a curing agent in a mixer and is held in cold storage at a temperature of about 28° F. for about five days to complete the cure. After completion of the cure, the meat is passed through a cutter or grinder to reduce it to the desired particle size, is subjected to vacuum to remove excess air and is canned. The meat is not cooked until after canning to reduce the shrinkage, but it has been found that with the standard process there is still a shrinkage on the order of about 3% and there is a certain amount of fatting-out resulting in a layer of fat around the meat.

This process requires a substantial period of time from production of the original chunks or trimmings to the finished canned product with several handlings of the material and the use of several different pieces of apparatus. Also during the cutting or grinding steps, the temperature of the meat increases substantially which may adversely affect the coloring and flavoring of the meat.

It is one of the objects of the present invention to provide a method of preparing meat products in which the meat is continuously processed from the original chunks or trimmings to the finished canned product in a single piece of apparatus with a single handling.

Another object is to provide a method in which the meat is mixed with a curing agent and the mixture is immediately reduced to the desired finished size to effect intimate mixing of the curing agent with the meat and an extremely rapid cure.

According to one feature, the meat is comminuted or reduced by passing knives therethrough at a high speed on the order of 120 feet per second while the meat is confined in a closed chamber having a screened outlet to regulate the particle size.

Another object is to provide a method in which the meat is cooled during comminuting by mixing a volatile cooling agent therewith.

According to a feature of the invention, the volatile cooling agent and excess air are removed from the comminuted material by subjecting it to a vacuum before canning.

The above and other objects and features of the invention will be more readily apparent from the following description when read in connection with the accompanying drawing, in which:

Figure 1 is a diagrammatic view with parts in section of an apparatus for carrying out the method of the present invention; and Figure 2 is a view similar to Figure 1 illustrating an alternative method.

The apparatus, as illustrated in Figure 1, comprises a plate mill 10 in which meat chunks or trimmings as received from the trimming floor may be fed and which is provided with a screen of about three-fourths inch openings to reduce the material to chunks not exceeding about three-fourths inch in diameter. This step is employed primarily to facilitate handling of the product and could be omitted if the chunks or trimmings were received in sizes capable of easy handling.

From the plate mill the meat material is fed through a conduit or conveyor 11 to a mixer 12 which is supplied with curing material, preferably in liquid form, through a conduit 13. The curing material may be a curing solution of the type commonly employed in the industry containing salt, sugar and other desired flavoring and curing agent in a liquid solution or suspension. In the mixer, the meat chunks or particles are thoroughly mixed with the curing agent and the mixture is then fed through a conduit or conveyor 14 into a comminuting machine.

The comminuting machine, as shown, may be constructed as more particularly disclosed and claimed in the co-pending application of Albert Kircher, Jr. and Dewey A. Manion, Jr., Serial No. 599,374, filed July 23, 1956. As shown the comminutor comprises a hollow frame 15 open at its top to receive a cover 16 which may be hollow on its outside, as indicated at 17, for circulation of a cooling liquid therethrough. The cover is supported on and closes the upper part of the frame 15 and its inner top surface is of generally cylindrical configuration. The cover is closed at its lower part by a perforated cylindrical screen 18 which may be detachably supported in arcuate tracks 19 on the sides of the frame portion 15 so that the cover and the screen together define a generally cylindrical comminuting chamber into which the conduit or conveyor 14 extends substantially tangentially at the upper part.

Material in the comminutor is cut by means of a rotor including a hub 21 coaxial with the chamber and driven by suitable motor means, not shown, at relatively high speed. The hub carries a series of relatively short flat radially projecting blades 22 spaced axially and circumferentially thereof and terminating at their tips near the inner wall of the cover and screen. The blades are relatively short, as shown, so that the velocity variation from the roots to the tips thereof will be minimized and the rotor is turned at such a speed that the inner portions of the blades will be moving at a speed on the order of at least 120 feet per second.

With this construction, as the meat chunks mixed with curing agent are fed into the communitor, the blades 22 will strike the chunks and cut them into smaller particles of a size to pass through the screen 18. The size of the screen may be changed depending upon the final product to be made, but will in general be designed to pass particles on the order of three-sixteenths inch to one-fourth inch. Due to the high speed of the knives, the meat particles will be cut while they are suspended in the communitor chamber and will be thoroughly admixed with the curing agent so that the discharged small particles will be thoroughly impregnated with curing agent and will cure substantially instantaneously. The high speed of the knives further homogenizes the fat content of the meat and substantially eliminates subsequent fatting out in the product.

The temperature of the meat will tend to increase during the comminuting operation due to friction thereon and the cutting of the meat itself and the cooling obtained through the cooling jacket 17 is insufficient to maintain the meat at an adequately low temperature. In this connection, the ideal temperature is 28° F., with a maximum permissible temperature of about 30° F and a minimum permissible temperature of about 25° F. below which the meat becomes too cold to be forced into the cans by the stuffer. In order to maintain the meat cooled during comminuting, a volatile cooling agent is injected into the comminuting chamber through a conduit 23 which preferably supplies the volatile cooling agent at a point closely adjacent to the inlet of the comminuting chamber. While substantially any volatile cooling agent which is non-toxic can be used such, for example, as $NO_2$, the preferred cooling agent is $CO_2$ which is injected in liquid form. The $CO_2$ as it volatilizes not only cools the meat but encloses it in an inert atmosphere to minimize discoloration. The quantity of cooling agent injected can be controlled, preferably automatically, to maintain the temperature of the comminuted product, leaving the comminuting chamber at about 28° F.

The comminuted material passing through the screen 18 is collected in the bottom part of the frame 15 and is removed therefrom by any suitable conveyor illustrated as a screw 24. The screw extends through a conduit 25 in which it may fit relatively tightly and which has a perforated section 26. The perforated section 26 is enclosed by a cover 27 connected through a conduit 28 to a source of vacuum to produce a partial vacuum in the conduit 25 so that the volatile cooling agent and excess air in the comminuted meat product will be drawn off. When $CO_2$ is used as the cooling agent, it can be recovered and reused for various purposes wherein the admixture of a small quantity of air is permissible.

After passing the vacuum section the material may be fed into a conventional can stuffer 29 wherein it is stuffed into cans and the cans, as shown at 31, may be fed to a retort 32 wherein the material is cooked.

It will be seen that according to the present invention, the raw material such as trimmings is passed continuously through the apparatus and emerges in final canned and cooked form with no intermediate handling and no delays. It is not necessary, according to the present process, to precool the material which can be supplied through the mixer to the comminuting chamber at substantially any existing temperature since the cooling effected in the comminuting chamber will be sufficient to bring the material quickly down to the desired 28° F. due to the intimate mixing of the cooling material with the meat in the comminuting chamber. Further it has been found that no delay is necessary for completion of the cure because the intimate mixing of the curing agent with the meat in the comminuting chamber results in a substantially instantaneous cure. It has also been found that when meat is processed according to the present invention shrinkage is almost completely eliminated thus saving not only the approximately 3% shrinkage which occurred in the can with conventional processes, but also saving the shrinkage which occurred while the meat was stored in carts for precooling and for curing with conventional processes.

Figure 2 illustrates a slightly modified method, parts therein corresponding to like parts in Figure 1 being indicated by the same reference numerals, plus 100. In this process meat trimmings or chunks may be supplied directly to an elongated conveyor 114 which discharges into the comminuting chamber in the manner of the conduit or conveyor 14 of Figure 1. If different types of trimmings or chunks are to be used there may be two or more hoppers, as shown at 33 and 34 to supply the different types of meat in the desired ratio to the conveyor. For example, the hopper 33 may supply shoulder trimmings and the hopper 34 may supply ham trimmings which will be mixed in the desired proportion in the conveyor. Beyond the last hopper in the direction of travel of the conveyor a curing agent is supplied to the conveyor through a conduit 113 which is connected thereto ahead of the discharge into the comminuting chamber. Due to the action of the conveyor the curing agent will be substantially uniformly mixed with the meat trimmings or chunks by the time it reaches the comminuting chamber and further intimate admixture of the curing agent with the meat will occur in the comminuting chamber. The remainder of the process is identical with that as described in connection with Figure 1 and results in the same advantages.

While two embodiments of the invention have been shown and described herein, it will be understood that they are illustrative only and not to be taken as a definition of the scope of the invention, reference being had for this purpose to the appended claims.

What is claimed is:

1. The method of preparing meat products which comprises continuously mixing chunks of raw meat with a curing agent, continuously comminuting the mixture of meat chunks and curing agent to reduce the size of the chunks and mix the curing agent intimately therewith, continuously mixing a non-toxic volatile liquid cooling material with the mixture during comminuting to cool the mixture to a temperature between 25° F. and 30° F. and maintain it at such temperature during comminuting, and after comminuting continuously removing excess air and volatilized cooling material from the comminuted mixture.

2. The method of preparing meat products which comprises continuously mixing chunks of raw meat with a curing agent, continuously comminuting the mixture of meat chunks and curing agent to reduce the size of the chunks and mix the curing agent intimately therewith, continuously adding liquid $CO_2$ to the mixture during comminuting in sufficient quantity to reduce the temperature thereof to about 28° F., and continuously subjecting the comminuted mixture to a partial vacuum to remove excess air and $CO_2$.

3. The method of preparing meat products which comprises continuously mixing chunks of raw meat with a curing agent, continuously passing the mixture continuously through a confined space, limiting the maximum size of particles leaving the confined space, continuously cutting the material in the confined space at a lineal cutting speed of at least 120 feet per second, continuously injecting a non-toxic volatile liquid cooling agent into the confined space in sufficient quantity to maintain the material therein at a temperature of about 28° F., continuously discharging the cut material from the confined space, continuously removing excess air and volatilized cooling agent from the material, canning the material, and cooking the canned material.

4. The method of preparing meat products which comprises continuously mixing chunks of raw meat with a curing agent, continuously passing the mixture continuously through a chamber, limiting the maximum size of particles leaving the chamber, continuously cutting the material in the chamber at a lineal cutting speed of at least 120 feet per second, continuously injecting liquid $CO_2$ into the chamber in sufficient quantity to maintain the temperature of the material therein at about 28° F., continuously discharging the material from the chamber, continuously subjecting the discharged material to a partial vacuum to remove excess air and $CO_2$ therefrom, canning the material, and cooking the canned material.

References Cited in the file of this patent

UNITED STATES PATENTS

| | | |
|---|---|---|
| 2,230,062 | Jordan | Jan. 28, 1941 |
| 2,535,405 | Fulton | Dec. 26, 1950 |
| 2,618,939 | Morrison | Nov. 25, 1952 |
| 2,681,279 | Sloan et al. | June 15, 1954 |